(12) United States Patent
Pishinov et al.

(10) Patent No.: US 10,505,946 B2
(45) Date of Patent: Dec. 10, 2019

(54) ADAPTIVE TOKEN CACHE MANAGEMENT (71) Applicant: VMware, Inc., Palo Alto, CA (US)

(72) Inventors: Lyubomir Pishinov, Sofia (BG); Dian Nikolov, Sofia (BG); Viktor Kaltchev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 190 days.

(21) Appl. No.: 15/351,905

(22) Filed: Nov. 15, 2016

(65) Prior Publication Data

US 2018/0139192 A1 May 17, 2018

(51) Int. Cl.
*H04L 29/06* (2006.01)
(52) U.S. Cl.
CPC ........ *H04L 63/108* (2013.01); *H04L 63/0815* (2013.01)
(58) Field of Classification Search
CPC ... H04L 63/06; H04L 63/108; H04L 63/0815; H04L 63/0435; H04L 63/0823; H04L 29/06; H04L 63/068; G06F 21/41; G06F 17/3017; G06F 17/30088; G06F 16/128; G06F 16/1774; G06F 9/4401; G06Q 20/3674; G06Q 20/382
USPC ..... 726/4, 5, 6, 9, 27, 3; 713/156, 185, 155, 713/172, 186; 709/224, 228; 707/785, 707/707, 9, 1, 10; 705/67, 76, 44; 717/11; 714/56
See application file for complete search history.

(56) References Cited

U.S. PATENT DOCUMENTS

| 7,720,864 B1 * | 5/2010 | Muth ..................... G06F 16/128 707/785 |
| 7,774,356 B2 * | 8/2010 | Cui .......................... G06F 9/52 707/769 |
| 8,065,717 B2 * | 11/2011 | Band ....................... G06F 21/31 380/229 |
| 8,312,272 B1 * | 11/2012 | Serenyi ................... G06F 21/33 713/168 |
| 8,533,796 B1 * | 9/2013 | Shenoy ............... H04L 63/0815 380/229 |

(Continued)

FOREIGN PATENT DOCUMENTS

KR 20150098077 A * 8/2015 ......... H04L 63/0846

OTHER PUBLICATIONS

M.W. Heyse, et al., "Data acquisition applications for long duration electromagnetic launcher experiments", Data acquisition applications for long duration electromagnetic launcher experiments—IEEE Journals & Magazine, Jan. 1993.*

(Continued)

*Primary Examiner* — Abu S Sholeman
*Assistant Examiner* — Raied A Salman (57) ABSTRACT

Embodiments perform token cache management by renewing tokens heuristically. A token renewal request interval is defined based on a configurable lifetime of a token and an acquisition duration. Upon expiration of the token renewal request interval, and in the event that the token is requested by at least one client application, the authentication module renews the token with a secure token service. Renewal may also occur in the absence of a request for the token by any client application if the cached token has been kept valid for less than a threshold time. In some examples, the tokens are associated with credentials for single sign-on during site recovery management.

20 Claims, 7 Drawing Sheets

(56) References Cited

U.S. PATENT DOCUMENTS

| | | | |
|---|---|---|---|
| 8,683,196 B2* | 3/2014 | Fu | H04L 63/0823 |
| | | | 705/44 |
| 9,191,375 B2* | 11/2015 | Kaler | H04L 63/0435 |
| 9,223,583 B2* | 12/2015 | Chang | G06F 9/4401 |
| 9,608,974 B2* | 3/2017 | Barrows | H04L 63/0846 |
| 2007/0101405 A1* | 5/2007 | Engle | H04L 63/0272 |
| | | | 726/4 |
| 2009/0248504 A1* | 10/2009 | Thomas | G06Q 30/02 |
| | | | 705/14.1 |
| 2010/0199336 A1* | 8/2010 | Tan | H04L 63/0846 |
| | | | 726/6 |
| 2010/0235286 A1* | 9/2010 | Moore | G06Q 10/107 |
| | | | 705/76 |
| 2015/0242840 A1* | 8/2015 | Kursun | G06Q 20/3224 |
| | | | 705/44 |
| 2015/0254650 A1* | 9/2015 | Bondesen | G06Q 20/3674 |
| | | | 705/67 |
| 2017/0006020 A1* | 1/2017 | Falodiya | H04L 63/0815 |
| 2018/0139192 A1* | 5/2018 | Pishinov | H04L 63/0815 |
| 2018/0183594 A1* | 6/2018 | Palanisamy | H04L 9/3213 |

OTHER PUBLICATIONS

Abhijeet Uday Gole, Master Token Resource Management Algorithm for Distributed System—Time Sharing Strategy, Dec. 2009, 2009 International Conference on Advances in Computing, Control, and Telecommunication Technologies, pp. 159-161.*

* cited by examiner

ADAPTIVE TOKEN CACHE MANAGEMENT

BACKGROUND

Some existing systems manage single sign-on (SSO) access to secure services using tokens provided by a secure token service (STS). Under existing systems, an application requests a token from the STS to access the secure service. In virtualized environments, where a number of applications are simultaneously requesting access to one or more secure services, the request process drains processing and communications resources and can delay issuance of tokens.

Even if a token cache is utilized by the existing systems, it is difficult for the existing systems to effectively and efficiently manage requests for new tokens because the cached tokens expire, which delays fulfilling the requests while the expired tokens are renewed in response to the requests.

SUMMARY

In some aspects, a method comprises maintaining a token having a configurable lifetime and associated token data in a local cache. The token is maintained by configuring the lifetime of the token, scheduling a token renewal request interval based on the configured lifetime and an acquisition duration, and renewing the token. For example, upon reaching the scheduled token renewal request interval, determining that there is no pending request for the token, and determining that the token has not been kept valid for greater than a threshold time, the token is renewed in anticipation of expiration of the token and the associated token data is updated.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Embodiments described herein describe a system and method for adaptively and heuristically managing tokens for use by client applications. The tokens and their associated token data are maintained in a token cache. Each token has a configurable lifetime. Based upon the configured lifetime and other token data such as the time it takes to acquire the token, a token renewal request interval is calculated. A subsequent request to renew the token is made upon reaching expiration of the scheduled token renewal request interval and upon heuristically determining that the token may still be required by one or more of the client applications.

One or more embodiments described herein include a lightweight, adaptive token management system. To facilitate a more efficient, adaptive token management system, expiration of the tokens is anticipated and renewal of the tokens is performed in anticipation of the expiration of the tokens.

Embodiments of the disclosure enable more efficient management of tokens and processing resources. The disclosure increases the speed of token delivery to client applications. For example, because the tokens are proactively managed by requesting new, renewed, or updated tokens before they are required (and sometimes even in the absence of any requests for the tokens), the client applications receive the tokens faster than if token acquisition occurred only in response to requests. The centralized management of the tokens for the client applications (e.g., through an authentication module) reduces processor load and reduces network bandwidth usage at least because requests for token renewals (e.g., from a secure token service) are distributed over time rather than simply in response to requests from the client applications. This results in improved user interaction experience.

Further, the disclosure issues only one request to the secure service, or other authentication system, per unique authentication data by queuing requests. This reduces network traffic and the load on the secure service. Also, using a local cache to store and deliver previously-issued tokens are satisfied from the cache and do not result in a remote service call (e.g., to the secure service). The disclosure also guarantees that the returned token has some minimal, configurable lifetime left.

Some aspects of the disclosure are described in the context of single sign-on authentication in distributed environments. In these examples, an authentication module manages the tokens in the cache. However, other operating environments are contemplated. For example, the disclosure may be used to validate any data associated with the tokens, and modules other than the authentication module may perform the operations described herein.

Further, aspects of the disclosure are operable with security assertion markup language (SAML) tokens. However, the disclosure is operable with any token having a configuration lifetime.

Some examples are also described herein with respect to recovery operations after migration of virtual computing instances. In these examples, to distribute the load on the secure token service across the recovery operations, the disclosure utilizes a heuristic approach for auto token renewal to predict the possibility that a token could be needed again later. For those tokens that satisfy the heuristic criteria, the disclosure automatically, at regular intervals, issues token renewal requests thus distributing the requests in time. Tokens that fail the test are evicted from the cache.

Figure 1:
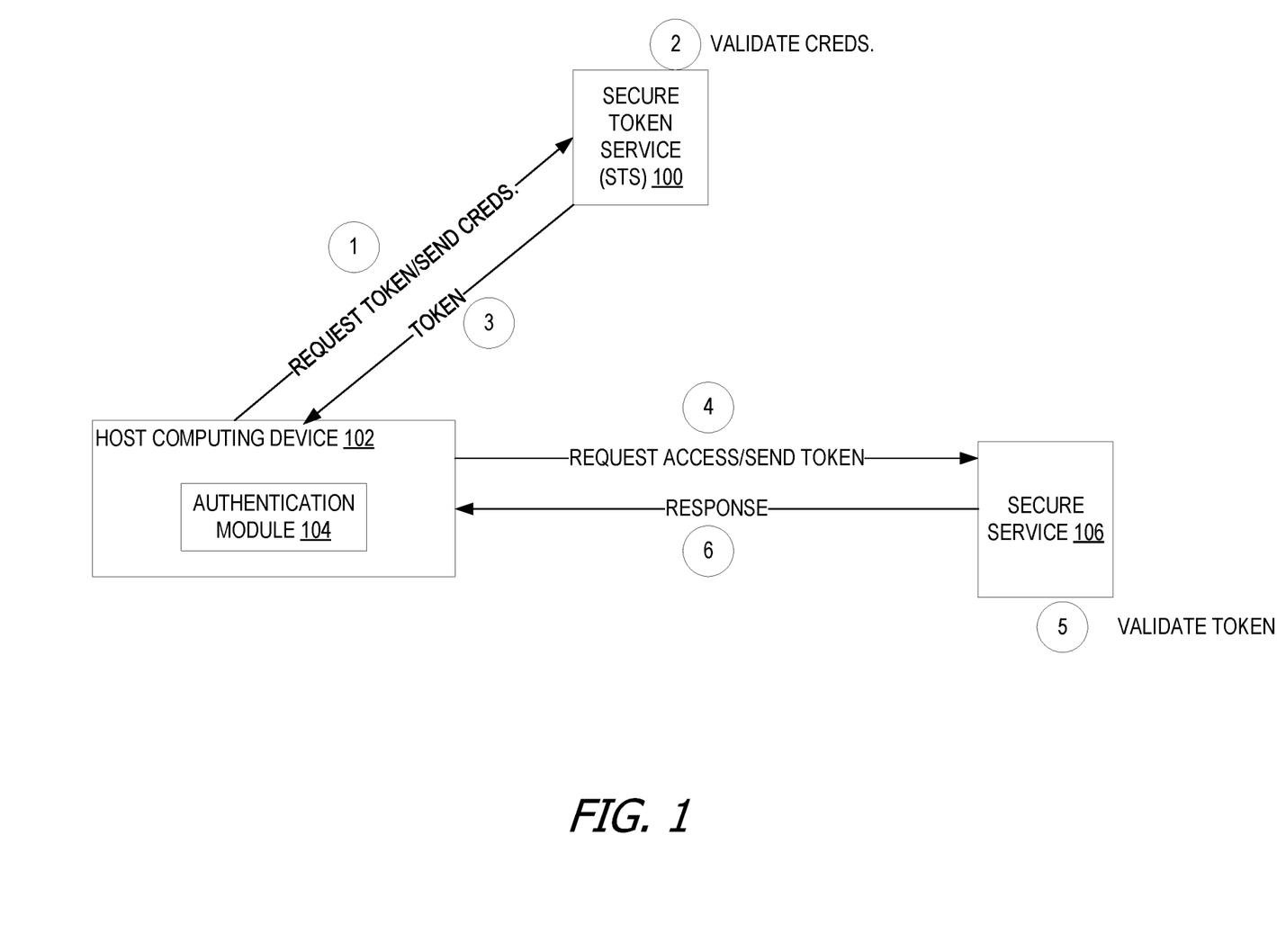
FIG. 1 is a block diagram of an exemplary system for token administration.

FIG. 1 is a block diagram of an exemplary system for token administration. In the example of FIG. 1, a host computing device 102, illustrated and described in more detail in FIG. 6 and the accompanying text, communicates with the secure token service (STS) 100 and a secure service 106. The numbered arrows show the direction, order, and content of the communications between the host computing device 102, the STS 100, and the secure service 106. The secure service represents, in this example, access control to a repository of information accessed with valid credentials. The credentials are associated with client applications, and linked to the token.

In the example of FIG. 1, the client application (illustrated and described in FIG. 2 and the accompanying text) requires a token to access the secure service 106. In some examples the secure service 106 is web-based and remote from the host computing device 102, but other types of applications, services, and content are contemplated. Access attempts are deemed successful with a valid token. The tokens are, in some examples, tokens with configurable lifetimes such as SAML tokens. The client application, via an authentication module 104, transmits its credentials and requests a token from the STS 100 at 1. At 2, the STS 100 validates the credentials transmitted by the authentication module, and provides the token to the authentication module at 3. The authentication module requests access to the secure service 106 at 4, on behalf of the client application. At 5, the secure service 106 validates the token (or credentials associated therewith) provided by the authentication module 104 and responds to the authentication module 104 at 6. If the token is validated, the client application is permitted access to the secure service, otherwise access is denied.

Figure 2:
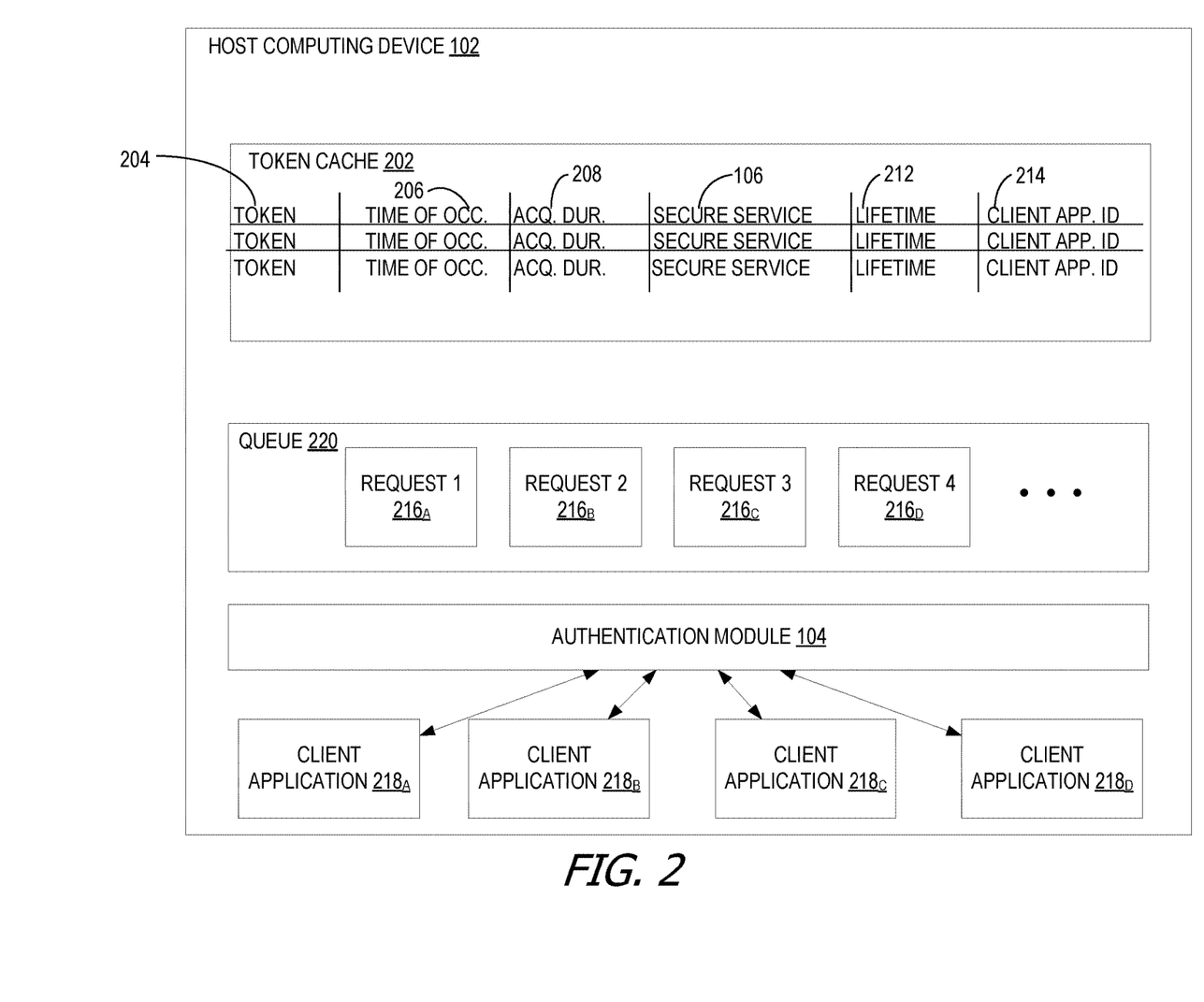
FIG. 2 is a block diagram of an exemplary system for adaptive token cache management.

FIG. 2 is a block diagram of an exemplary system for adaptive token cache management. The host computing device 102, illustrated and described in more detail in FIGS. 6 and 7 and the accompanying text, includes a local cache or token cache 202, a queue 220, an authentication module 104, and several client applications 218A, 218B, 218c, and 218D. Although only four client applications are illustrated, any number of client applications 218 may be present on the host computing device 102. Further, the client applications 218 may be virtualized, such as shown in FIG. 7. The client applications 218 are in communication with the authentication module 104. In virtualized examples, the authentication module may be implemented as part of a hypervisor.

Each client application 218 is identified by a client application identifier (ID) 214. The authentication module manages requests 216 for tokens 204, as well as the associated token data. As the requests are received from the client applications 218, the pending requests are maintained by the authentication module 104 in order in the queue 220. The order of the requests 216 in the queue may establish a broadcast order as tokens are updated or renewed. For example, the authentication module 104 broadcasts updated tokens based upon the order of the requests 216 in the queue 220.

The authentication module 104 further maintains the token cache 202. The token cache 202 includes a plurality of tokens 204 as well as the associated token data. The token data includes, for example, times of occurrence 206 for each token 204, an acquisition duration 208 for each token, information identifying the associated secure service 210 relating to each token 204, a lifetime 212 of the token 204, and the client application ID 214 of each token 204.

The time of occurrence 206 of each token 204 reflects the most recent time the token 204 was requested by any client application 218. When the authentication module receives a new request to use a token 204, the time of occurrence 206 for that token is stored and/or updated. The acquisition duration 208 represents, for each token 204, how long it takes the authentication module 104 to receive a new token 204 from the STS 100 in response to a request from the authentication module 104. The acquisition duration 208 is used to calculate a token renewal request interval, described in more detail in the text accompanying FIG. 3.

The associated token data may further include information regarding the associated secure service 210 that each client application 218 is attempting to access. The secure service 210 is, as an example, a secure web-based service which requires a security check before permitting access to content. The remaining amount of the configurable lifetime 212 of each token 204 is also tracked. Finally, the token cache 202 further stores the client application ID 214 for each client application making token requests. The client application ID is, in some examples, an alphanumeric identifier for the client application.

As an example of the described and illustrated system, client application 218A attempts to access the secure service 106. Client application $218_A$ transmits its request to the authentication module 104. The token 204 for secure service 106 has not yet been acquired, so a new entry is created in the token cache 202. The request is listed in the next position in the queue 220, in this example it is request 1 $216_A$. Upon receiving the token 204, token data for the token 204 associated with the secure service 106 is populated with the time of occurrence 206 of the request, the acquisition duration 208, the secure service 210 associated with the token 204, the lifetime 212 of the token 204, and/or the requesting client application ID 214.

Figure 3:
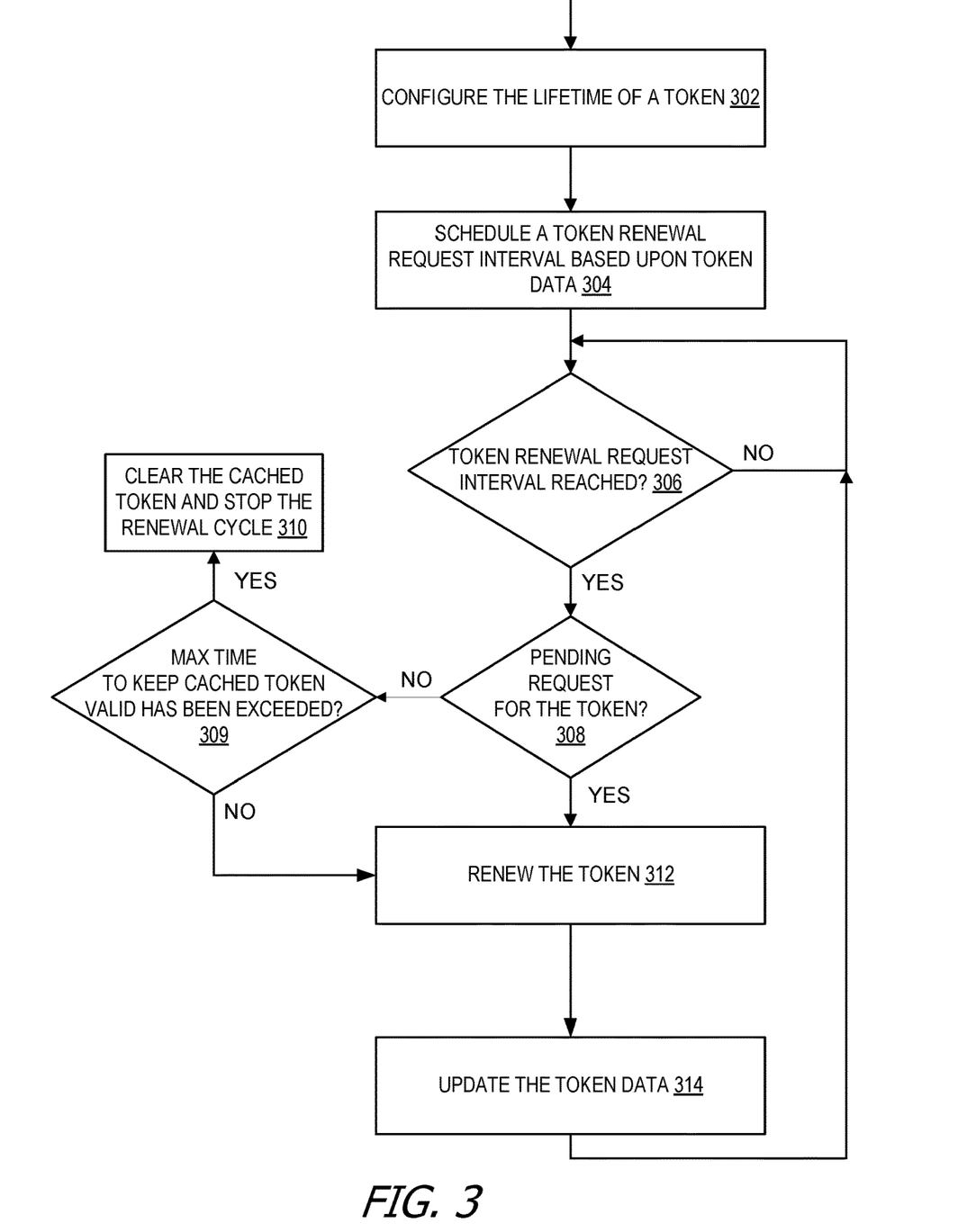
FIG. 3 is a flowchart of an exemplary method performed by the system to heuristically manage and update tokens.

FIG. 3 is a flowchart of an exemplary method performed by the system to heuristically manage and update tokens. The method is performed by the authentication module in this example, based upon requests from client applications. However, other modules or components may perform one or more of these operations. In the illustrated example, the authentication module also renews the token based upon pending requests or anticipated expiration of the token. At operation 302, the authentication module configures the lifetime of the token. The lifetime may be based on user input, or other factors. The duration of the lifetime of the token, and thus the time remaining before the token expires, is maintained in the token cache as part of the token data. This data is relied upon by the authentication module to determine a token renewal request interval for the token.

At operation 304, the authentication module schedules the token renewal request interval based upon the token data. The token renewal request interval is based upon various token data stored in the token cache. As an example, the token renewal request interval is a function of the remaining configurable lifetime of the token and the acquisition duration of the token. In some examples, other metrics are incorporated into the calculation. As an example, the authentication module may be operating during a time of high transmission congestion, or there may be an unusually large number of requests, or there may be other factors which affect the configurable lifetime. Although described primarily as heuristically calculated, the token renewal request interval can also correspond to a defined period of time. In some examples the token renewal request interval may be defined by a user, by a policy federated by an administrator, or some other defined amount of time, such as twice the configured lifetime of the token.

In some examples, the lifetime for the token may be five minutes and the minimal remaining configurable lifetime is thirty seconds. In this example, the interval may be scheduled to be three and a half minutes given a one-minute acquisition duration. During the interval, only one request to the STS occurs, all other requests for the token are delivered from the cache. For example, the schedule interval may be defined as follows:

scheduleInterval=tokenLifeTime−max(minRemainingLifeTime,2*acquisitionDuration)

where the minimal remaining token life time is a configurable parameter based on the system requirements.

The authentication module then evaluates whether the token renewal request interval has been reached at operation 306. Once the token renewal request interval is reached, the authentication module evaluates whether there are pending requests for the token from client applications at operation 308.

If there are no pending requests, the authentication module determines at 309 whether the cached token has been keep valid for longer than a threshold time. In some examples, the threshold time is referred to as the maximum time to keep a cached token valid. This threshold time is a configurable parameter that may be based on system requirements, and may be specific to the particular token, to the particular type of token, or to the particular data associated with the token. In other examples, the threshold time is the same for all cached tokens. The authentication module maintains the cumulative amount of time that the token has been kept valid (e.g., renewed), which may partly or exclusively include time that the token has been kept valid in the absence of any token renewal requests from applications. This maintained value may be reset upon receipt of a token renewal request.

If the threshold time has been exceeded at 309, it is determined that the token is stale and no longer needed by any client applications. The token is then cleared from the token cache, and the renewal cycle is terminated at operation 310. Otherwise, the token is renewed at operation 312. Upon renewing the token at 312, the applicable token data is updated at operation 314, and the renewal cycle begins again at operation 302. Updating the token data at 314 may include performing operations 302 and 304.

Figure 4:
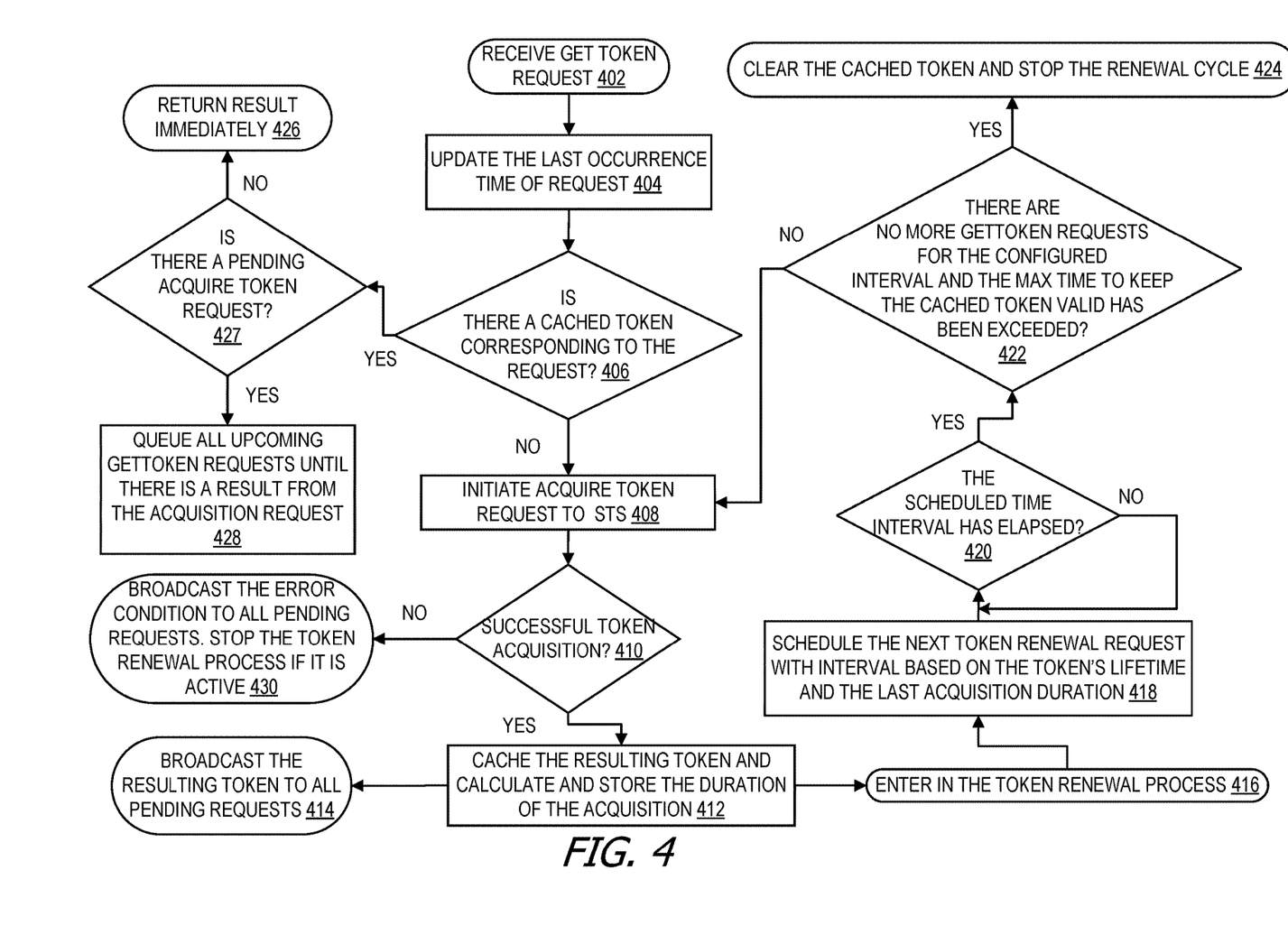
FIG. 4 is a block diagram of an exemplary workflow for managing and updating tokens.

FIG. 4 is a block diagram of an exemplary workflow performed by the authentication module for managing and updating tokens. At 402 the authentication module receives a get token request from a client application. Multiple tokens can be requested by a plurality of client applications, or a single token can be requested by the plurality of client applications. The authentication module updates the last occurrence time of the request in the token cache, as well as which credentials are associated with the request. The authentication module may also identify which secure service the request is associated with at operation 404. Maintaining the time of the last occurrence in the token cache enables the authentication module to be able to calculate the token renewal request interval.

At 406 the authentication module evaluates whether there is already a cached token associated with the credentials (e.g., for that secure service) in the token cache. In some examples, the token has been previously requested by that client application or another client application. In that case the authentication module evaluates whether there is a pending acquire token request at operation 427. If another client application, or the same client application, previously requested a token for that secure service, and the request has not yet been satisfied, there is a pending acquire token request at 427. These requests are maintained in a queue. If there is no pending acquire token request, but the token is already in the token cache, then it is returned to the requesting client application immediately at 426. If there is already a pending acquire token request, then at operation 428 the application module queues the additional request from the client application into the existing queue, until the result from the pending request is received and is broadcast to all client applications with requests in the queue.

If at operation 406 the token is not already cached, then the authentication module initiates the acquire token request at operation 408. The acquisition is performed through the secure token service (STS). If the token is successfully acquired at 410, then the result token is stored in the cache, and maintained there at 412. The result token is then broadcasted to all the requesting client applications, which are tracked in the queue, at operation 414. In addition to broadcasting the token at 414, the token renewal process commences at 416. At 418 the authentication module schedules the next token renewal request interval by evaluating the token's lifetime and the acquisition duration of the token. This token data is stored in the token cache. For example, the interval is scheduled to be some amount shorter than the sum of the token's lifetime and the acquisition duration, to allow the renewal to complete prior to expiration of the token.

At 420, if the scheduled time interval of the token renewal request interval has elapsed, the authentication module at 422 evaluates whether there are other requests from client applications for the token and whether the cached token has been kept valid longer than a threshold time. If there are no further requests and the cached token has been kept valid longer than the threshold time, the token is cleared from the token cache at 424 and the renewal cycle for that token terminates. Otherwise, the authentication module returns to operation 408, where it acquires the token from the STS.

If the token is not successfully acquired at 410, then an error condition is broadcast to all the client applications with pending requests for the token for that secure server at 430. If it is active, the token renewal process as commenced at 416 is also terminated upon an error condition at 430.

Figure 5:
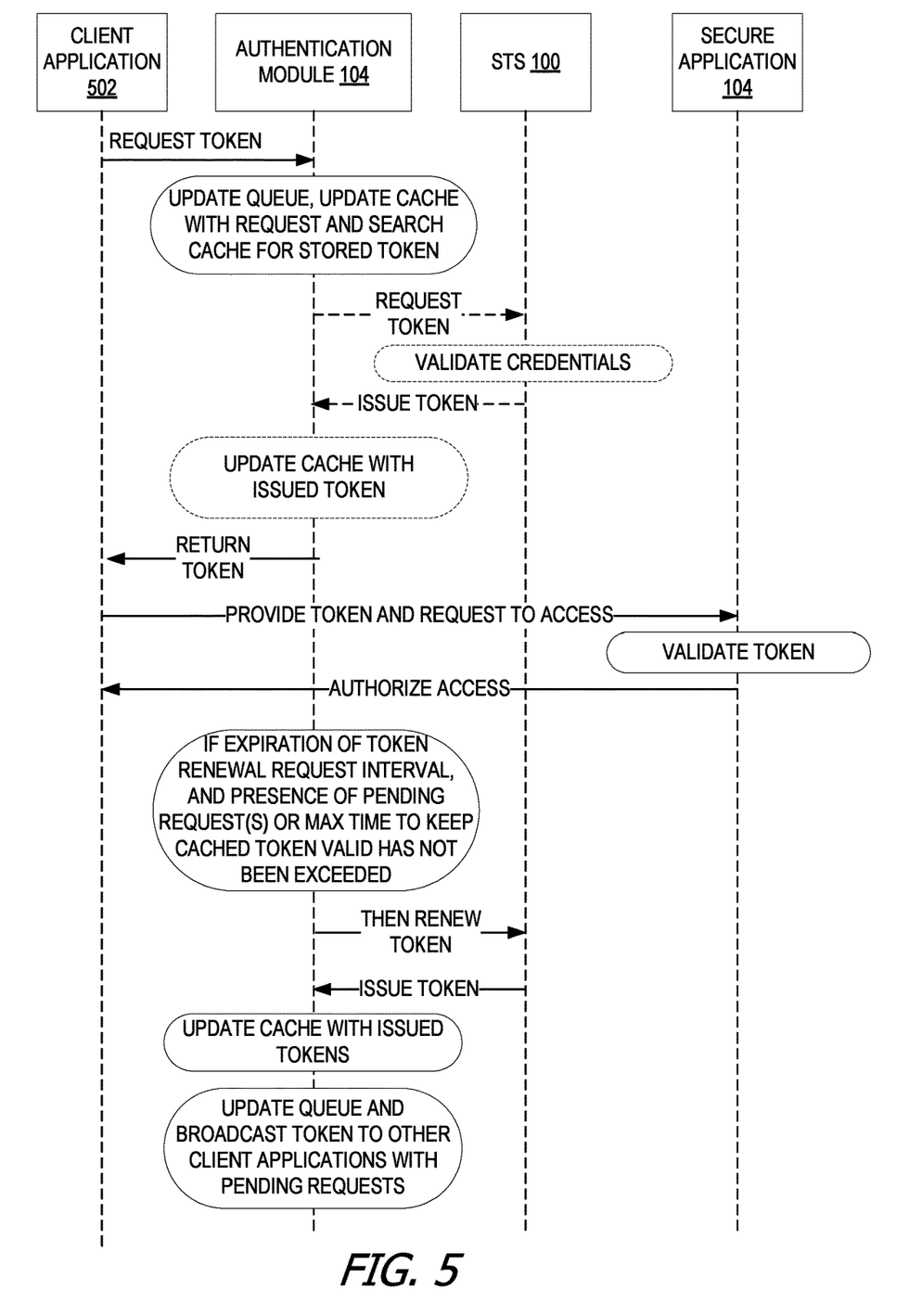
FIG. 5 is a sequence diagram as performed by the exemplary system for managing and updating tokens.

FIG. 5 is a sequence diagram as performed by the exemplary system for managing and updating tokens. FIG. 5 illustrates the interactions between the client application, the authentication module, the STS and the secure application. The client application initially requests a token from the authentication module, which updates the queue with information about the request, and also updates the token cache. The authentication module searches for the token in the token cache, and either returns the stored token or requests a token from the STS. The STS validates the credentials provided by the authentication module, and issues the token to the authentication module. After receiving the token, the authentication module updates the token cache with the token and the associated token data, and provides the token to the client application and any other requesting client applications recorded in the queue.

The client applications, with the token, request access to the secure service and provide the token to the secure service. Upon validating the token, the secure service allows the client applications to access the secure service. The authentication module continues to update the queue, and broadcast or share the token to other client applications with pending requests. As the token renewal request interval expires, the authentication module evaluates whether there are any pending requests for the token or, in the absence of any request, whether a threshold time to keep the cached token valid has not been exceeded. If yes to either condition, then a new token is acquired from the STS. The token cache is updated with the token issued by the STS.

Figure 6:
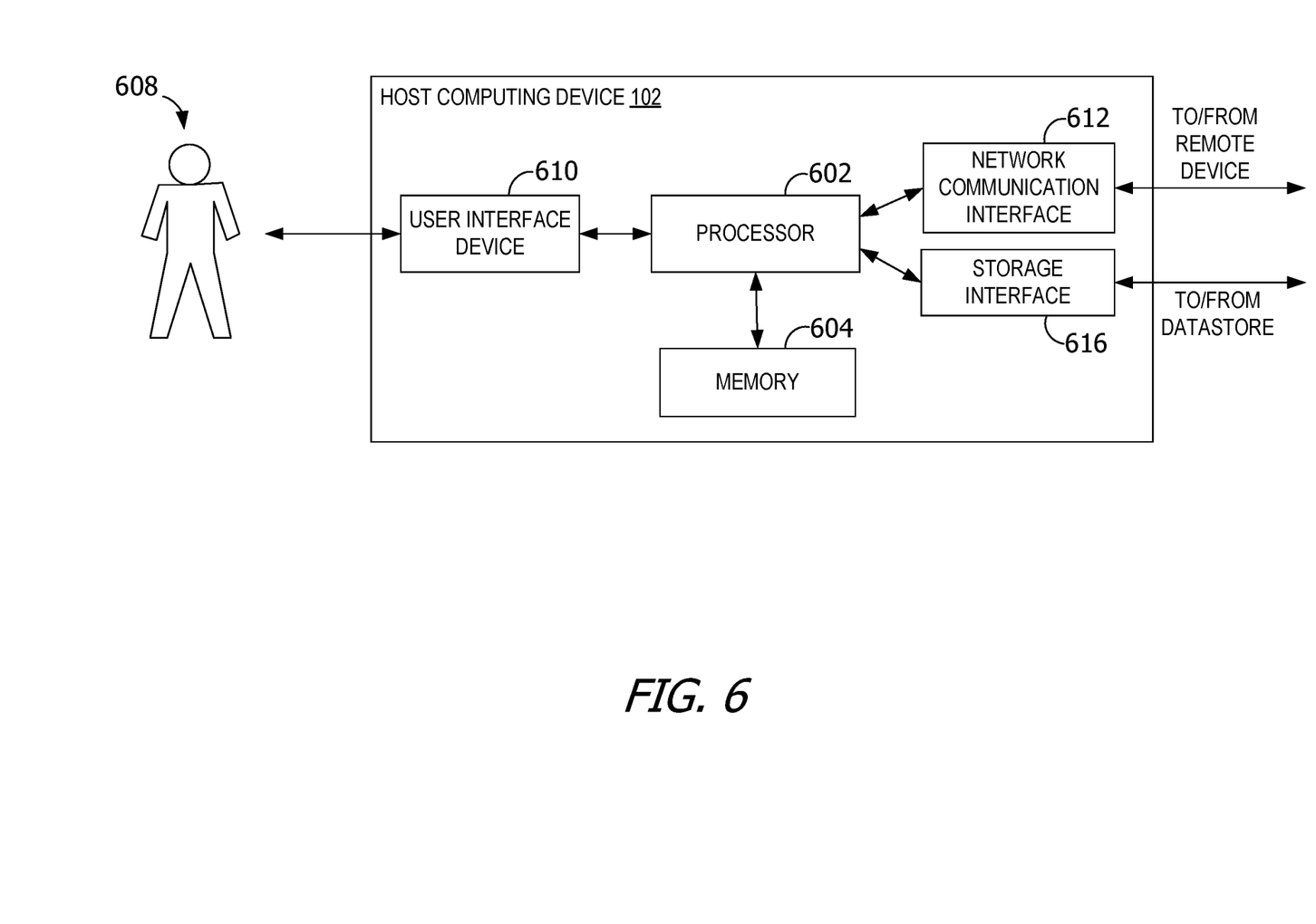
FIG. 6 is a block diagram of an exemplary host computing device.

FIG. 6 is a block diagram of an example host computing device 102. Host computing device 102 includes a processor 602 for executing instructions. In some examples, executable instructions are stored in a memory 604. Memory 604 is any device allowing information, such as executable instructions and/or other data, to be stored and retrieved. For example, memory 604 may include one or more random access memory (RAM) modules, flash memory modules, hard disks, solid state disks, and/or optical disks.

Host computing device 102 may include a user interface device 610 for receiving data from a user 608 and/or for presenting data to user 608. User 608 may interact indirectly with host computing device 102 via another computing device such as a device running VMware's vCenter Server or other management device. User interface device 610 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 610 operates to receive data from user 608, while another device (e.g., a presentation device) operates to present data to user 608. In other examples, user interface device 610 has a single component, such as a touch screen, that functions to both output data to user 608 and receive data from user 608. In such examples, user interface device 610 operates as a presentation device for presenting information to user 608. In such examples, user interface device 610 represents any component capable of conveying information to user 608. For example, user interface device 610 may include, without limitation, a display device (e.g., a liquid crystal display (LCD), organic light emitting diode (OLED) display, or "electronic ink" display) and/or an audio output device (e.g., a speaker or headphones). In some examples, user interface device 610 includes an output adapter, such as a video adapter and/or an audio adapter. An output adapter is operatively coupled to processor 602 and configured to be operatively coupled to an output device, such as a display device or an audio output device.

Host computing device 102 also includes a network communication interface 612, which enables host computing device 102 to communicate with a remote device (e.g., another computing device) via a communication medium, such as a wired or wireless packet network. For example, host computing device 102 may transmit and/or receive data via network communication interface 612. User interface device 610 and/or network communication interface 612 may be referred to collectively as an input interface and may be configured to receive information from user 608.

Host computing device 102 further includes a storage interface 616 that enables host computing device 102 to communicate with one or more data storage devices, which store virtual disk images, software applications, and/or any other data suitable for use with the methods described herein. In example examples, storage interface 616 couples host computing device 102 to a storage area network (SAN) (e.g., a Fibre Channel network) and/or to a network-attached storage (NAS) system (e.g., via a packet network). The storage interface 616 may be integrated with network communication interface 612.

Figure 7:
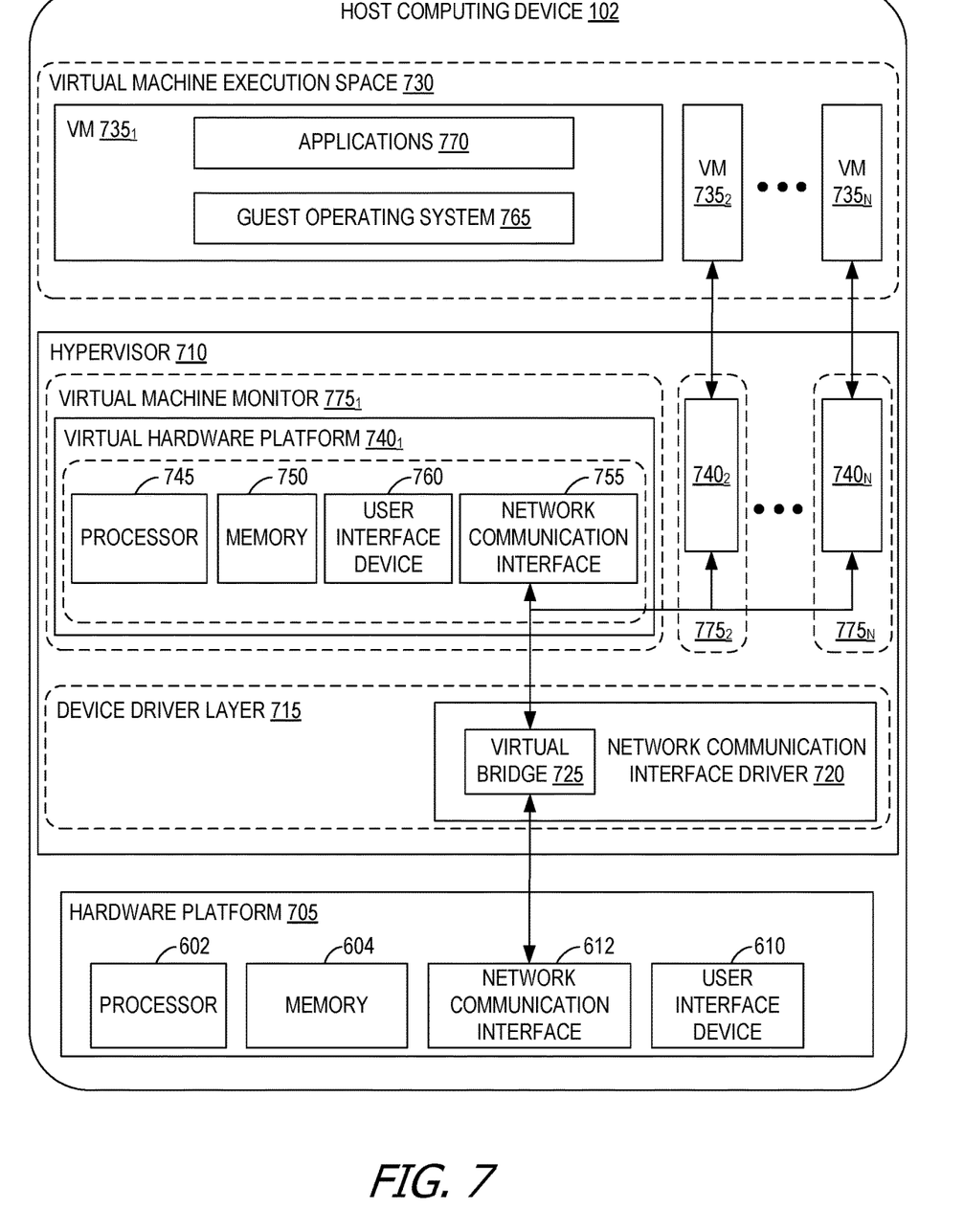
FIG. 7 is a block diagram of virtual machines that are instantiated on a computing device, such as the host computing device shown in FIG. 6.

FIG. 7 depicts a block diagram of virtual machines $735_1$, $735_2$ ... $735_N$ that are instantiated on host computing device 102. Host computing device 102 includes a hardware platform 705, such as an x86 architecture platform. Hardware platform 705 may include processor 602, memory 604, network communication interface 612, user interface device 610, and other input/output (I/O) devices, such as a presentation device. A virtualization software layer, also referred to hereinafter as a hypervisor 710, is installed on top of hardware platform 705.

The virtualization software layer supports a virtual machine execution space 730 within which multiple virtual machines (VMs $735_1$-$735_N$) may be concurrently instantiated and executed. Hypervisor 710 includes a device driver layer 715, and maps physical resources of hardware platform 705 (e.g., processor 602, memory 604, network communication interface 612, and/or user interface device 610) to "virtual" resources of each of VMs $735_1$-$735_N$ such that each of VMs $735_1$-$735_N$ has its own virtual hardware platform (e.g., a corresponding one of virtual hardware platforms $740_1$-$740_N$), each virtual hardware platform having its own emulated hardware (such as a processor 745, a memory 750, a network communication interface 755, a user interface device 760 and other emulated I/O devices in VM $735_1$). Hypervisor 710 may manage (e.g., monitor, initiate, and/or terminate) execution of VMs $735_1$-$735_N$ according to policies associated with hypervisor 710, such as a policy specifying that VMs $735_1$-$735_N$ are to be automatically restarted upon unexpected termination and/or upon initialization of hypervisor 710. In addition, or alternatively, hypervisor 710 may manage execution VMs $735_1$-$735_N$ based on requests received from a device other than host computing device 102. For example, hypervisor 710 may receive an execution instruction specifying the initiation of execution of first VM $735_1$ from a management device via network communication interface 612 and execute the execution instruction to initiate execution of first VM $735_1$.

In some examples, memory 750 in first virtual hardware platform $740_1$ includes a virtual disk that is associated with or "mapped to" one or more virtual disk images stored on a disk (e.g., a hard disk or solid state disk) of host computing device 102. The virtual disk image represents a file system (e.g., a hierarchy of directories and files) used by first VM $735_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 715 includes, for example, a communication interface driver 720 that interacts with network communication interface 612 to receive and transmit data from, for example, a local area network (LAN) connected to host computing device 102. Communication interface driver 720 also includes a virtual bridge 725 that simulates the broadcasting of data packets in a physical network received from one communication interface (e.g., network communication interface 612) to other communication interfaces (e.g., the virtual communication interfaces of VMs $735_1$-$735_N$). Each virtual communication interface for each VM $735_1$-$735_N$, such as network communication interface 755 for first VM $735_1$, may be assigned a unique virtual Media Access Control (MAC) address that enables virtual bridge 725 to simulate the forwarding of incoming data packets from network communication interface 612. In an example, network communication interface 612 is an Ethernet adapter that is configured in "promiscuous mode" such that all Ethernet packets that it receives (rather than just Ethernet packets addressed to its own physical MAC address) are passed to virtual bridge 725, which, in turn, is able to further forward the Ethernet packets to VMs $735_1$-$735_N$. This configuration enables an Ethernet packet that has a virtual MAC address as its destination address to properly reach the VM in host computing device 102 with a virtual communication interface that corresponds to such virtual MAC address.

Virtual hardware platform $740_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 765 in order to execute applications 770 for an instantiated VM, such as first VM $735_1$. Virtual hardware platforms $740_1$-$740_N$ may be considered to be part of virtual machine monitors (VMM) $775_1$-$775_N$ that implement virtual system support to coordinate operations between hypervisor 710 and corresponding VMs $735_1$-$735_N$. Those with ordinary skill in the art will recognize that the various terms, layers, and categorizations used to describe the virtualization components in FIG. 7 may be referred to differently without departing from their functionality or the spirit or scope of the disclosure. For example, virtual hardware platforms $740_1$-$740_N$ may also be considered to be separate from VMMs $775_1$-$775_N$, and VMMs $775_1$-$775_N$ may be considered to be separate from hypervisor 710. One example of hypervisor 710 that may be used in an example of the disclosure is included as a component in VMware's ESX brand software, which is commercially available from VMware, Inc.

While some virtualized embodiments are described with reference to VMs for clarity of description, the disclosure is operable with other forms of virtual computing instances (VCIs). A VCI may be a VM, a container, and/or any other type of virtualized computing instance.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these examples. each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

ADDITIONAL EXAMPLES

The following scenarios are merely exemplary and not intended to be limiting in any way.

In one scenario, the disclosed system and method is utilized in site recovery management. A site recovery manager utilizes tokens with configurable lifetimes, such as SAML tokens, to perform in-guest operations in a secure manner. At the recovery side, a device asks the single sign-on server to acquire a token for authentication to a service for one or more VMs at the time of recovery. By proactively issuing token renewal requests over time and then caching the tokens, interaction of a computing device with the STS is reduced thus reducing bandwidth and processor resource consumption. For example, the disclosure operates to reduce the load on a single sign-on STS during virtual infrastructure disaster recovery.

Embodiments of the disclosure contemplate any combination of the following:

A computer system comprising a processor and a non-transitory computer readable medium having stored thereon program code for transferring data to another computer system, the program code causing the processor to maintain a token having a configurable lifetime and associated token data in a local cache by:

configuring the lifetime of the token;

scheduling a token renewal request interval based on the configured lifetime and an acquisition duration;

upon reaching the scheduled token renewal request interval, determining that there is no pending request for the token, and determining that the token has not been kept valid for greater than a threshold time;

requesting renewal of the token in anticipation of expiration of the token; and updating the associated token data.

wherein a queue stores of a plurality of pending token requests from a plurality of client applications.

wherein the processor is programmed to broadcast, from the local cache, the token or the renewed token to one or more of the plurality of client applications in response to the one or more of the plurality of pending token requests.

wherein the token is associated with single sign-on credentials for authentication to a secure service.

wherein the processor is programmed to evict the token from the local cache upon classifying the token as stale.

wherein classifying the token as stale comprises evaluating the token data to determine that the token has been kept valid in the local cache for longer than a threshold time in the absence of a request for the token.

wherein the associated token data comprises one or more of the following: an occurrence time, a lifetime, an acquisition duration, an associated service, and a plurality of associated client applications.

A method comprising:

maintaining a token having a configurable lifetime and associated token data in a local cache by:

configuring the lifetime of the token;

scheduling a token renewal request interval based on the configured lifetime and an acquisition duration; and upon reaching the scheduled token renewal request interval, determining that there is no pending request for the token, and determining that the token has not been kept valid for greater than a threshold time:

requesting renewal of the token in anticipation of expiration of the token; and updating the associated token data.

wherein maintaining the associated token data comprises updating at least one or more of the following: an occurrence time, a lifetime, an acquisition duration, an associated service, and a plurality of associated client applications.

wherein maintaining the associated token data further comprises updating the occurrence time when a subsequent request for the token is received.

wherein maintaining the token and the associated token data further comprises updating the associated token data after renewal to reflect the associated token data for the renewed token.

further comprising distributing requests for renewal of tokens over time to reduce interaction with a secure token service over a network.

further comprising maintaining a queue comprising a plurality of requests for the token from client applications.

further comprising:

broadcasting the renewed token to the client applications; and evicting the requests from the queue.

A non-transitory computer readable storage medium having stored thereon program code executable by a first computer system at a first site, the program code embodying a method comprising:

maintaining a token having a configurable lifetime and associated token data in a local cache by:

configuring the lifetime of the token;

scheduling a token renewal request interval based on the configured lifetime and an acquisition duration;

upon reaching the token renewal request interval, determining that there is no pending request for the token, and determining that the token has not been kept valid for greater than a threshold time:

requesting renewal of the token in anticipation of expiration of the token; and updating the associated token data.

wherein the program code embodies the method further comprising maintaining a queue with a plurality of requests from a plurality of client applications.

wherein the program code embodies the method further comprising requesting the token renewal request interval from a user.

wherein the threshold time is a configurable parameter based on input from a user.

wherein the program code embodies the method further comprising configuring a dynamic minimal remaining token lifetime to be a user-specified minimum remaining lifetime or twice a token acquisition duration, whichever is greater.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements. In some examples, this program code is embodied on a non-transitory computer readable medium, such as the mediums disclosed herein. The aggregation of the elements described herein is referred to in some examples as a computer system.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A computer system comprising:
a processor;
and a non-transitory computer readable medium having stored thereon program code for transferring data to another computer system, the program code causing the processor to maintain a token having a configurable lifetime and associated token data in a local cache by:
configuring the lifetime of the token;
scheduling a token renewal request interval based on the configured lifetime and an acquisition duration, the acquisition duration representing a time taken to receive a renewed token from a secure token service in response to a request for a token from the secure token service;
upon reaching the scheduled token renewal request interval, and determining that there is no pending request for the token and that the token has not been kept valid for greater than a threshold time, requesting renewal of the token in anticipation of expiration of the token;
updating the associated token data, receiving requests for a token from the local cache from one or more of a plurality of client applications, maintaining the received requests in a queue in an order in which the requests are received;
and broadcasting, from the local cache, renewed tokens to the one or more of the plurality of client applications in the order in which the requests are maintained in the queue.

2. The computer system of claim 1, wherein requesting renewal of the token in anticipation of expiration of the token comprises heuristically predicting that the token will be needed for accessing a secure service.

3. The computer system of claim 2, wherein the token is associated with single sign-on credentials for authentication to the secure service.

4. The computer system of claim 1, wherein the processor is further programmed to schedule the token renewal request interval to be shorter than a sum of the lifetime of the token and the acquisition duration.

5. The computer system of claim 1, wherein the processor is further programmed to classify the token as stale, the classifying comprising evaluating the token data to determine that the token has been kept valid in the local cache for longer than a threshold time in the absence of a request from the plurality of clients for the token from the local cache.

6. The computer system of claim 1, wherein the associated token data comprises one or more of the following:
an occurrence time, a lifetime, the acquisition duration, an associated service, and a plurality of associated client applications.

7. A method comprising:
maintaining a token having a configurable lifetime and associated token data in a local cache by:
configuring the lifetime of the token;
scheduling a token renewal request interval based on the configured lifetime and an acquisition duration, the acquisition duration representing a time taken to receive a renewed token from a secure token service in response to a request for a token from the secure token service;
and upon reaching the scheduled token renewal request interval, and determining that there is no pending request for the token and that the token has not been kept valid for greater than a threshold time, requesting renewal of the token in anticipation of expiration of the token;
updating the associated token data, receiving requests for a token from the local cache from one or more of a plurality of client applications, maintaining the received requests in a queue in an order in which the requests are received;
and broadcasting, from the local cache, renewed tokens to the one or more of the plurality of client applications in the order in which the requests are maintained in the queue.

8. The method of claim 7, further comprising:
broadcasting the renewed token to the client applications;
and evicting a request associated with the renewed token from the queue.

9. The method of claim 7, wherein maintaining the associated token data comprises updating at least one or more of the following:
an occurrence time, a lifetime, the acquisition duration, an associated service, and a plurality of associated client applications.

10. The method of claim 7, wherein requesting renewal of the token in anticipation of expiration of the token comprises heuristically predicting that the token will be needed for accessing a secure service.

11. The method of claim 7, wherein maintaining the token and the associated token data further comprises updating the associated token data after renewal to reflect the associated token data for the renewed token.

12. The method of claim 7, further comprising distributing requests for renewal of tokens over time to reduce interaction with the secure token service over a network.

13. The method of claim 7, wherein scheduling a token renewal request interval comprises scheduling a token renewal request interval to be shorter than a sum of the lifetime of the token and the acquisition duration.

14. A non-transitory computer readable storage medium having stored thereon program code executable by a first computer system at a first site, the program code embodying a method comprising:
maintaining a token having a configurable lifetime and associated token data in a local cache by:
configuring the lifetime of the token;
scheduling a token renewal request interval based on the configured lifetime and a token acquisition duration, the token acquisition duration representing a time taken to receive a renewed token from a secure token service in response to a request for a token from the secure token service;

upon reaching the token renewal request interval, and determining that there is no pending request for the token, and that the token has not been kept valid for greater than a threshold time;

requesting renewal of the token in anticipation of expiration of the token;

updating the associated token data, receiving requests for a token from the local cache from one or more of a plurality of client applications, maintaining the received requests in a queue in an order in which the requests are received;

and broadcasting, from the local cache, renewed tokens to the one or more of the plurality of client applications in the order in which the requests are maintained in the queue.

15. The non-transitory computer readable storage medium of claim 14, wherein requesting renewal of the token in anticipation of expiration of the token comprises heuristically predicting that the token will be needed for accessing a secure service.

16. The non-transitory computer readable storage medium of claim 14, wherein the threshold time is a configurable parameter based on input from a user.

17. The non-transitory computer readable storage medium of claim 14, wherein the program code embodies the method further comprising configuring a dynamic minimal remaining token lifetime to be a user-specified minimum remaining lifetime or twice the token acquisition duration, whichever is greater.

18. The non-transitory computer readable storage medium of claim 14, wherein the program code embodies the method further comprising scheduling the token renewal request interval to be shorter than a sum of the lifetime of the token and the acquisition duration.

19. The non-transitory computer readable storage medium of claim 14, wherein the program code embodies the method further comprising classifying the token as stale, the classifying comprising evaluating the token data to determine that the token has been kept valid in the local cache for longer than a threshold time in the absence of a request from the plurality of clients for the token from the local cache.

20. The non-transitory computer readable storage medium of claim 14 wherein the associated token data comprises one or more of the following:

an occurrence time, a lifetime, the acquisition duration, an associated service, and a plurality of associated client applications.

* * * * *